May 14, 1963 P. J. GOOD 3,089,658
FILM PROCESSING APPARATUS
Filed July 11, 1960 4 Sheets-Sheet 1

May 14, 1963 P. J. GOOD 3,089,658
FILM PROCESSING APPARATUS
Filed July 11, 1960 4 Sheets-Sheet 2

May 14, 1963 P. J. GOOD 3,089,658
FILM PROCESSING APPARATUS
Filed July 11, 1960 4 Sheets-Sheet 3

May 14, 1963 P. J. GOOD 3,089,658
FILM PROCESSING APPARATUS
Filed July 11, 1960 4 Sheets-Sheet 4

United States Patent Office 3,089,658
Patented May 14, 1963

3,089,658
FILM PROCESSING APPARATUS
Paul J. Good, Rochester, N.Y., assignor to Dynacolor Corporation, Rochester, N.Y., a corporation of New York
Filed July 11, 1960, Ser. No. 42,010
10 Claims. (Cl. 242—55.01)

The present invention relates to film processing apparatus and, more particularly, to a film storage elevator to enable a continuous passage of film out of the storage elevator for a limited time even though feeding of film into the elevator may be stopped for intervals to provide the time needed to attach fresh rolls of film, for instance.

In a commercial film processing laboratory, rolls or lengths of film to be processed are spliced together to form an endless web which is conducted through the various stages of processing equipment to provide continuous treatment. A storage elevator of the type herein described comprises an upper fixed set of rollers and a lower set of rollers on a movable carriage, the film passing, for instance, from an upper roller to a lower roller, then to the next upper roller, and so on. When a fresh roll or length of film is to be attached, feed of film into the storage elevator is stopped temporarily, but a uniform passage of film from the elevator is assured for a limited time as the lower movable carriage rises toward the upper rollers to supply this amount of film. After the new roll or length of film has been spliced on, the film is released into the elevator and the lower carriage descends, drawing in film until the carriage stops at its lower limit. If the movable carriage is not restrained in its downward movement, however, it may descend at such a rate that the mechanism may be damaged or the film become loose and tangled, or both. Various arrangements have been proposed to avoid this defect, but are unsatisfactory as to one feature or another.

An object of the invention is to provide a new and improved film storage elevator for more dependably assuring a uniform passage of film from the storage elevator during the time that fresh rolls of film are being spliced on and feeding of film into the elevator is temporarily stopped.

Another object is the provision of a new and improved film storage elevator having an upper fixed carriage and a lower movable carriage between which the film passes, arranged so that the movable carriage ascends and descends back to a limiting position in a manner avoiding damage to the machine and entanglement and loosening of the film.

Still another object is to provide a film storage elevator of the foregoing type wherein a controlled rate of descent of the movable carriage is established which cannot be exceeded and will not vary.

These and other desirable objects may be attained in the manner disclosed as an illustrative embodiment of the invention in the following description and in the accompanying drawings forming a part hereof, in which.

The same reference numerals throughout the several views indicate the same parts.

Figure 2:
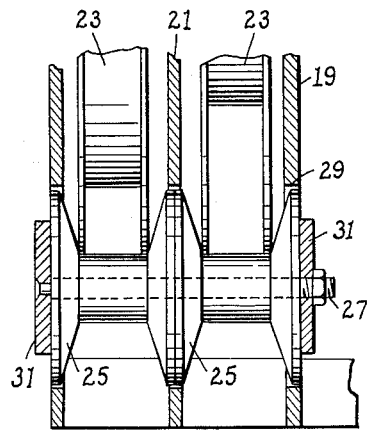
FIG. 2 is a cross section through the reel box shown in FIG. 1 and taken approximately on the line 2—2 of FIG. 1.
Figure 1:
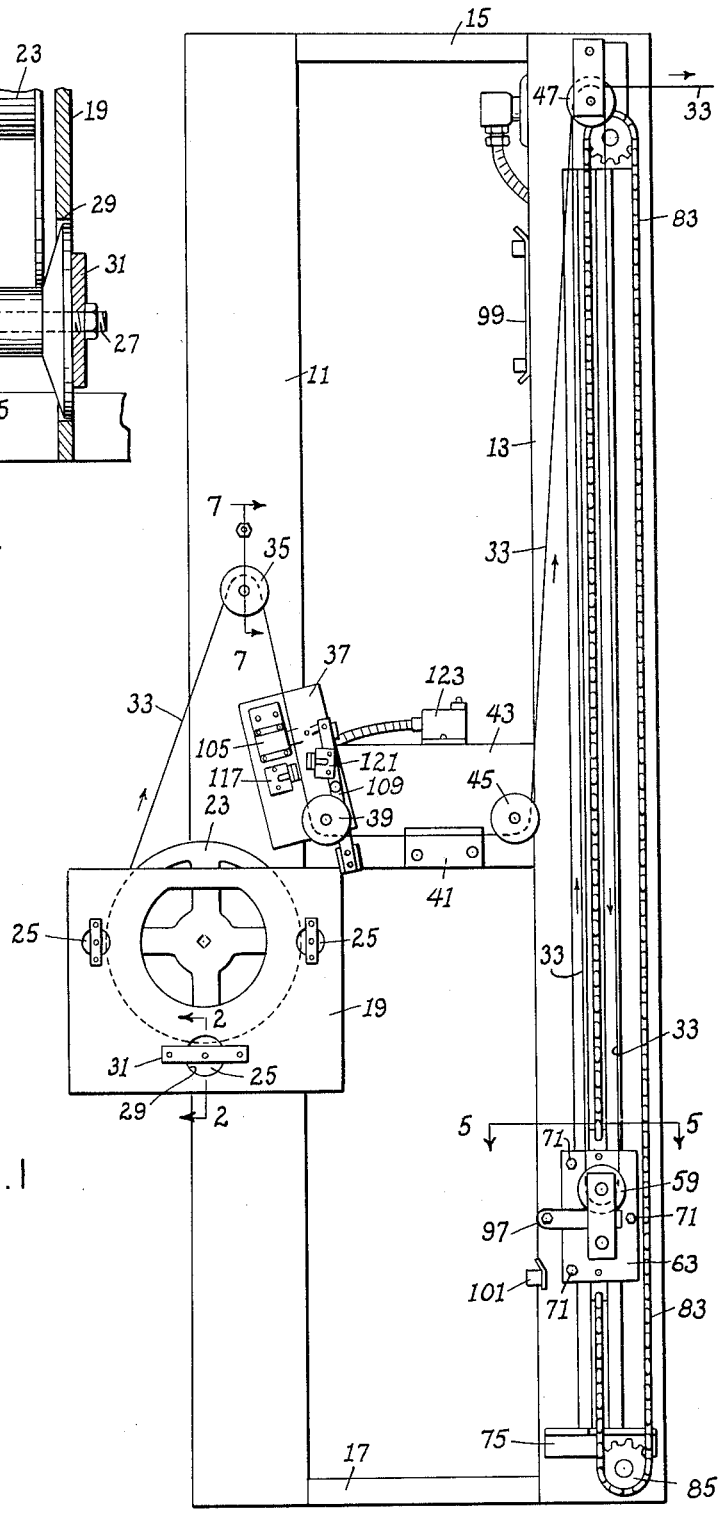
FIG. 1 is a front elevational view of the film storage elevator according to the invention, the lower movable carriage being shown in an intermediate position just above its lower limiting position.

Referring to FIG. 1, the film storage elevator of the invention is mounted on an upright frame including a pair of vertically disposed parallel side members 11 and 13 connected together at the top by a cross member 15 and at the bottom by another cross member 17. A reel box 19 is either permanently or removably mounted on the side frame member 11. The reel box 19, like the upright frame, is preferably made of wood and has a central partition 21, see FIG. 2, dividing the box 19 into two parallel compartments. Each of the compartments is adapted to receive a film reel 23, the two film reels each being mounted for rotation within its respective compartment. One of the reels 23 is intended to be in use, while the other reel is in reserve, in a position of readiness to have its end spliced to the end of the film on the reel which is in use, when the film has been run off. The rotatable mounting for the reels 23 furthermore are so arranged that the reels may be easily and conveniently placed into operative position in the box 19 and removed from it. For this purpose, each compartment has three rollers 25 disposed at approximately 90° intervals around a semi-circular arc on which three points of the periphery of the reel 23 rests. As shown in FIG. 2, the corresponding rollers for each compartment are in alinement, mounted for rotation on a common shaft 27 extending through alined apertures 29 in the sides of the box 19 and its central partition 21. The shaft 27 is supported at each end in a bearing plate 31 which has a length larger than the aperture 29 so that it may be clamped against the side of the box 19. With this arrangement, each reel 23 may be inserted into its respective compartment in the reel box 19 supported for rotation on the three rollers 25 bearing on its periphery. The reels 23 are in position for rotation immediately upon being placed into the box 19, and may be removed simply by lifting upwardly. When the film from one of the reels has run off, the leading edge of the reserve reel may be spliced to the free end of the film so that the feeding of the film is continuous with the exception of small intervals required to splice the end of the one reel to the leading end of the other reel.

The film coming off of the reel 23 in use is indicated in FIG. 1 at 33. From this point, the film 33 moves upwardly over a guide roller 35 mounted for rotation on a shaft supported on the side frame member 11. The film 33 then passes downwardly through a clamping unit 37, the structure and operation of which will be explained later. Briefly, the purpose of this unit is to clamp the film 33 when it has run off of the reel 23 which is in use, to stop the feeding of film into the film storage elevator for a period of time necessary to splice the leading end of the reserve reel onto the end of the film which has run off of the other reel.

After passing through the clamping unit 37, the film 33 rolls over another guide roller 39 through a bad splice detector 41 mounted on a central cross frame member 43 extending between the two side frame members 11 and 13. The bad splice detector 41 may be of any suitable construction, and is designed to detect splices in the film 33 which are not in good side to side alinement. Ordinarily a bad splice will not pass through the device 41, so that the continuous feeding of film into the remainder of the machine is stopped. The film 33 next passes over another guide roller 45 mounted on the cross frame member 43, and thereafter moves upwardly over the inner rollers of an upper fixedly mounted set of upper rollers 47.

The roller 35 may conveniently be called the entrance roller of the apparatus, although this expression could equally refer to any of the rollers 39 or 45 or the first one of the upper group or series of rollers 47. The last one of the rollers 47 may be called the exit roller.

Figure 3:
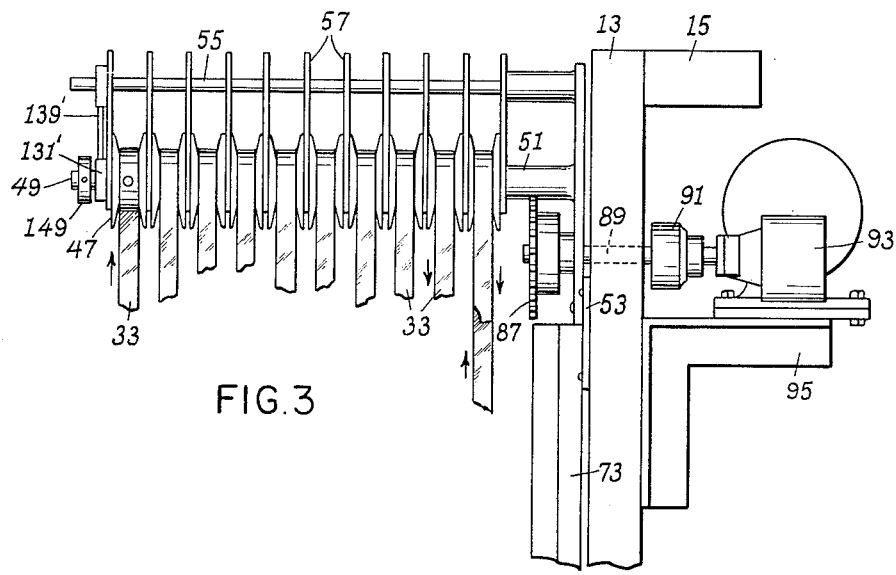
FIG. 3 is a side elevational view, to an enlarged scale, of only the upper portion of the machine of FIG. 1 including the upper fixed row of rollers.

Referring to FIG. 3, it can be seen that there are a plurality of upper rollers 47 mounted for rotation on a common shaft 49 extending forwardly from a mounting bracket 51. The bracket 51 is mounted at its lower end on a mounting plate 53 appropriately fastened to the front surface of the side frame member 13. Extending above the row of rollers 47 is a rod 55 extending forwardly approximately parallel to the shaft 49 and supported in like manner in cantilever fashion by the bracket 51. A plurality of separator plates 57 are mounted spaced along the rod 55 and extend downwardly between adjacent pairs of the rollers 47 to separate them for rotation. More particularly, the separator plates 57 may have a pair of apertures through one of which the rod 55 extends, while the shaft 49 extends through the other.

Disposed below the upper rollers 47 is another set of lower rollers 59, see FIG. 4. The row of lower rollers 59 is mounted on a shaft 61 extending forwardly in cantilever fashion from a movable carriage plate 63. The plate 63 is part of a movable carriage mounted in a manner to be explained for vertical motion toward and away from the row of upper rollers 47. Like the upper set of rollers, the lower rollers 59 are separated for rotation by a plurality of separator plates 65 mounted on the shaft 61 and also on a rod 67 extending forwardly from the carriage plate 63. The outermost of the separator plates 65 is retained in place by a collar 69 secured to the shaft 61.

Upon leaving the guide roller 45, FIG. 1, the film 33 passes upwardly over the innermost of the upper rollers 47, then downwardly over the first of the lower rollers 59, thence upwardly over the next upper roller 47, and so on between succeeding upper and lower rollers. It is preferable to have one more upper roller than lower roller, so that the film 33 enters the rows of rollers at an upper roller, and leaves at an upper roller. Upon leaving the film storage elevator upon passing over the last of the upper rollers 47, the film 33 passes to the next unit of the film processing apparatus. It is seen that there is a continuous feeding of film from the film storage elevators so long as the film 33 is unrolled from the reel 23, and passes continuously through the storage elevator. By moving the lower set of rollers 59 toward the upper set of rollers 47, however, it is still possible to feed continuously from the storage elevator even though the film entering the first of the upper rollers 47 is stopped temporarily due to being caught in the bad splice detector 41, or being clamped by the clamping unit 37 when it is necessary to change reels. As the lower rollers 59 move toward the upper rollers 47, the excess taken up between the sets of rollers provides the continuous feed even though the passage of film into the sets of rollers is temporarily stopped.

Figure 5:
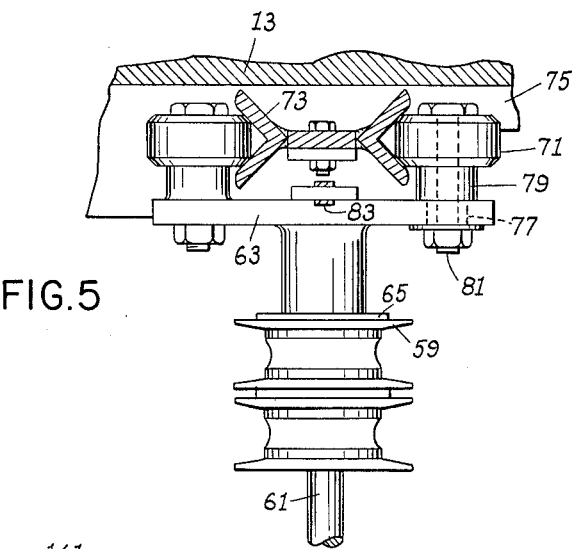
FIG. 5 is an enlarged cross section taken approximately on the line 5—5 of FIG. 1.
Figure 6:
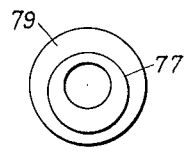
FIG. 6 is an end view of an adjustment hub for one of the guide rollers shown in FIG. 5.

To mount the lower row of rollers 59 for vertical movement, the movable carriage plate 63 (FIG. 5) has secured to it a plurality of rollers 71 disposed on opposite sides of a guide rail 73. The guide rail 73 desirably comprises two oppositely disposed V-shaped rails connected by a central web member. Referring to FIGS. 3 and 4, the guide rail 73 is welded at the top to the mounting plate 53, and is supported at the bottom in an appropriate manner, such as being welded to an angle bracket 75 secured to the front surface of the side frame member 13. The guide rail 73, of course, extends vertically approximately parallel to the front surface of the frame member 13. There are preferably three of the guide rollers 71, two at one side, and one at the other side, engaged in the V-shaped portions of the guide rail 73 for rolling along them. The rollers 71 are mounted on shafts extending rearwardly from the carriage plate 63. The mounting of the one roller 71 at one side is preferably adjustable for alinement purposes. For this purpose the one roller 71 at one side is mounted on an eccentrically formed shoulder 77, see FIG. 6, of an adjustment hub 79. The hub 79 is mounted on a shaft 81 extending rearwardly from the carriage plate 63. By turning the adjustable hub 79, it can be seen that the roller 71 is adjusted with regard to the guide rail 73, during the assembly.

To provide a drive for the movable carriage and the lower set of rollers, which are mounted for vertical movement, there is secured as shown in FIG. 1 a sprocket chain 83 to two lugs at the top and bottom of the carriage plate 63. The sprocket chain 83 extends downwardly over a sprocket gear 85 supported for rotation as also shown in FIG. 4 forwardly of the side frame member 13 below the guide rail 73. The sprocket chain 83 then extends upwardly over an upper sprocket gear 87 supported for rotation on a shaft 89 (FIG. 3) extending rearwardly through the bracket 51 and a bore in the side frame member 13. The upper sprocket 87 is the drive sprocket, and for this reason the shaft 89 is connected to the output of an overrunning clutch 91 driven by a suitable electric motor 93. The motor 93 is carried by an angle member 95 fastened to the rear of the side frame member 13.

The motor 93 is a gear motor of the type having a fixed speed output, and this determines the rate at which the sprocket chain 83 is driven by the sprocket gear 87. The arrangement is such that the movable carriage and the lower set of rollers 59 may rise at any rate of speed. Its descent, however, is limited by the fixed speed output of the motor 93. The overrunning clutch 91 is interposed to lock to the motor drive should the movable carriage and lower set of rollers 59 attempt to descend at a rate faster than this. The movable carriage may freely rise at any time, since the clutch 91 is always free in this direction. The controlled rate of descent of the movable carriage assures that the movable carriage will not descend too quickly, resulting in a damage to the mechanism or the film becoming loose or tangled, or both.

The movable carriage and lower set of rollers 59 begins to rise whenever there is a drag or stoppage in the feeding of the film 33 to the first of the upper rollers 47. The drive for the film coming out of the storage elevator (for instance, as described in applicant's copending application, Serial No. 4,470, filed January 25, 1960, now Patent 2,967,473, granted January 10, 1961) continues to operate, and in order to continue the feeding of film, it is necessary for the movable carriage to rise to supply the film needed to provide a continuous operation from the supply stored in the elevator between the upper and lower sets of rollers. The normal operation of the machine is that upon reaching the end of the film in the reel 23 which is then in use, the weight of the reel itself, assuming that the end of the film is attached to the reel, provides a drag which stops the feeding of film to the upper set of rollers 47. It is also possible for a bad splice to be detected by the bad splice detector 41, and to stop the feeding of the film in this manner.

Limits are provided for the upward and downward movement of the movable carriage and lower set of rollers 59. For this purpose, there is secured to the movable carriage plate 63 a sidewardly projecting arm 97 having at its outer end a cam follower. A limit for travel of the movable carriage and lower set of rollers 59 in the upper direction is provided by the engagement of the cam arm 97 with a switch 99. The structure of the switch 99 is not shown here fully, but it will be understood to be any suitable type whose actuating bar is normally biased inwardly in open position, and which may be engaged by the cam arm 97 to be moved outwardly to closed position. The switch 99 is electrically connected with a master switch, not here shown, for stopping the operation of the film processing machine and, in particular, the drive for feeding the film strip from the storage elevator. Thus, travel of the movable carriage in an upward direction is limited by engagement of the cam arm 97 with the switch 99, to stop the entire machine and assure that the film is not broken.

Figure 4:
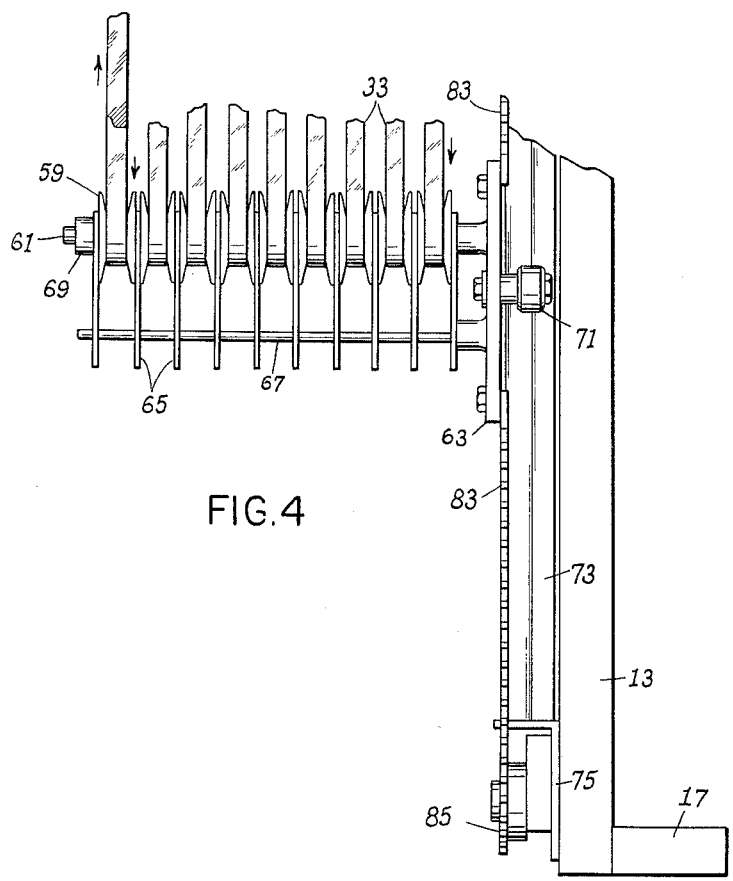
FIG. 4 is a side elevational view, to an enlarged scale, of the lower portion of the machine of FIG. 1, illustrating the lower movable carriage and row of rollers.

A limit for travel of the movable carriage in a downward direction is provided by the engagement of the lower edge of the carriage plate 63 with the forward edge of the upper arm of the angle bracket 75 as most clearly seen in FIG. 4. A switch 101 may be provided to be actuated by the arm 97 to turn off the motor 93 just before or about the time that the movable carriage reaches its lowest position. At the start of the ascent of the movable carriage, the cam arm 97 moves off of the switch 101 to actuate a bell or buzzer, not here shown, to indicate audibly to the operator that the machine requires attention. Normally this means that more film is to be spliced on, although it may signal a bad splice detected by the bad splice detector 41 or other sources of trouble in the machine.

Figure 9:
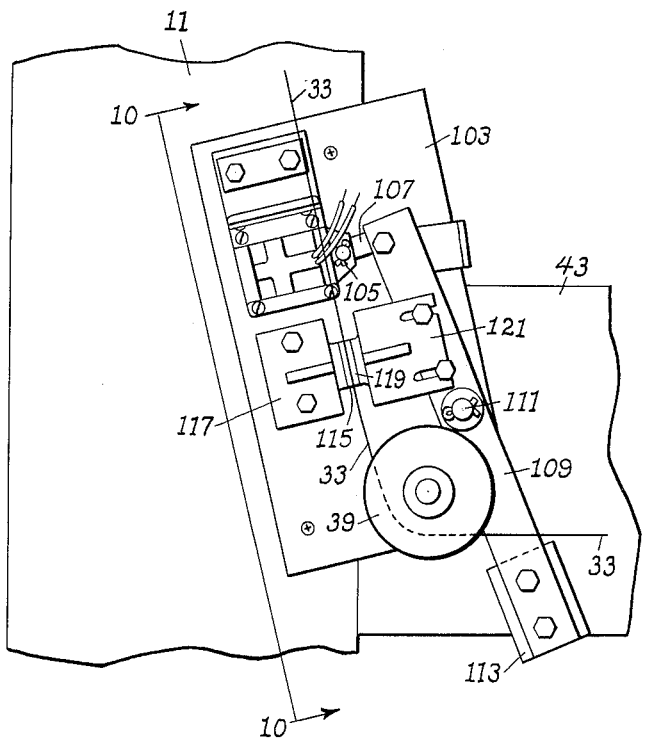
FIG. 9 is an enlarged front elevational view of the clamp unit shown in FIG. 1, here illustrated in clamping position.
Figure 10:
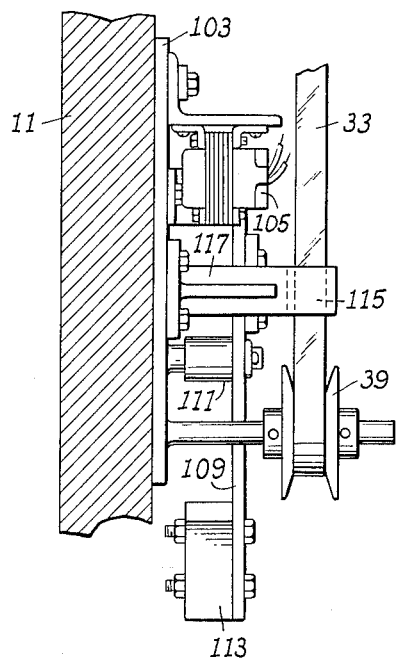
FIG. 10 is a side elevational view of FIG. 9 taken on the line 10—10 of FIG. 9, the frame on which it is mounted being shown in section.

Movement of the arm 97 off of the switch 101 also serves to actuate the clamping unit 37. As best seen in FIGS. 9 and 10, the clamping unit is mounted upon a base plate 103 secured to the side frame member 11. The unit includes a solenoid 105 having a solenoid pin which is retracted inwardly when the coils of the solenoid are energized. A connecting link 107 is pivoted to the solenoid pin and to the upper arm of a double armed lever 109 pivotally mounted on the base plate 103 at 111. The lower end of the lever 109 carries a counterweight 113 which serves to normally retract the solenoid pin out of the solenoid 105. The coils of the solenoid are electrically connected with the switch 101 to be energized when the movable carriage begins its ascent, resulting in the lever 109 being swung counterclockwise against the force of the weight 113.

The film 33 moves downwardly past the clamping unit at one side of a permanently mounted clamping jaw 115. The clamping jaw 115 is secured to a forwardly extending arm of a bracket 117 mounted on the base plate 103. Another movable clamping jaw 119 is carried by the lever 109 for movement toward and away from the other jaw 115. The clamping jaw 119 is carried by the forwardly extending arm of a bracket 121 which is slidably mounted on the lever 109 for adjustment purposes. With this arrangement, the movable clamping jaw 119 is retracted when the movable carriage and bottom set of rollers 59 are in their lower rest position, allowing free movement of the film 33 through the clamping unit 37 as shown in FIG. 1. However, when the storage elevator begins to operate and the movable carriage moves upwardly to close the switch 101 and energize the solenoid 105, the lever 109 is swung counterclockwise to move the clamping jaw 119 toward the clamping jaw 115 and clamp the film 33 between them. In this way, feeding of film 33 into the upper set of rollers 47 is stopped temporarily for splicing on a new reel of film. Upon completing the splice, the solenoid 105 is deenergized manually by actuating a switch 123 mounted on the central cross frame member 43.

Figure 7:
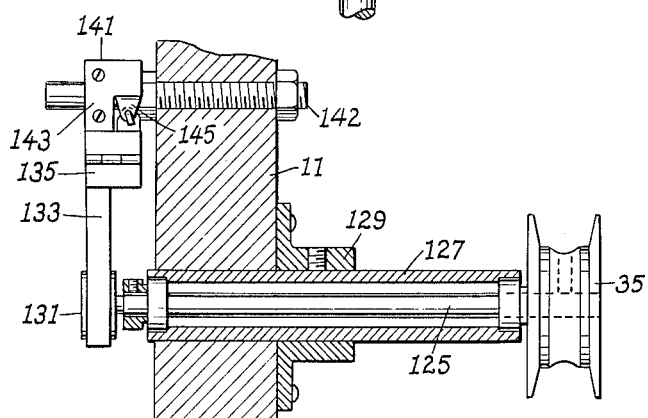
FIG. 7 is an enlarged cross sectional view of a portion of the machine of FIG. 1 taken approximately on the line 7—7 thereof.
Figure 8:
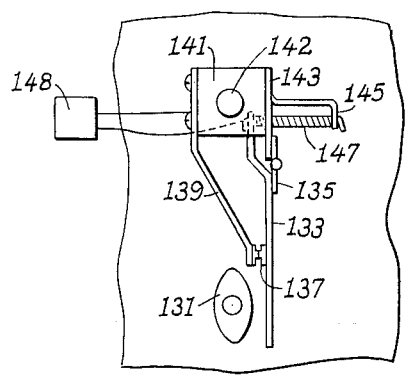
FIG. 8 is an end view of the device of FIG. 7, looking from the left.

An additional control for indicating the operational condition of the storage elevator machine is illustrated in FIGS. 7 and 8. The previously mentioned guide roller 35 is carried by a shaft 125 having bearings rotatable in a tube 127 extending through an aperture in the side frame member 11 and supported by a collar 129 fastened to the front surface of the frame member 11. The rear end of the shaft 125 has fastened to it an oval shaped cam 131. The cam 131 thus rotates with the guide roller 35 whenever the film 33 is feeding past the roller 35.

The two longer ends of the cam 131 are alternately engageable with a hinge arm 133 carried by one leaf of a hinge 135. The arm 133 carries a switch contact 137 which is normally biased into engagement in a manner to be explained with another contact carried by a depending arm 139. The arm 139 is permanently mounted on a block 141 carried by a bolt 142 extending rearwardly through an aperture in the side frame member 11. The other half of the hinge 135 is fixed to a bracket 143 fastened to the other side of the block 141. To bias the hinge arm 133, the bracket 143 has a sidewardly extending arm 145, and a spring 147 extends between the end of this arm and an extension of the hinge arm 133. With this arrangement, the movable switch contact 137 is biased by the spring 147 into contact with the fixed switch contact on the arm 139. However, when the cam 131 rotates and its longer ends engage the hinge arm 133, the hinge arm 133 is urged counterclockwise as shown in FIG. 8 to break the electrical contact.

Whenever the film 33 is feeding continuously through the storage elevator, it is seen that the guide roller 35 and the cam 131 are rotating substantially uniformly, to result in a continuous making and breaking of the movable contact 137 with the fixed switch contact on the arm 139. The switch contacts are electrically connected with a suitable electronic device to sense this alternate making and breaking of contacts and to signal to the operator whenever there is a lapse of more than five seconds, for instance, in this making and breaking of contacts. The signal and electronic apparatus are shown diagrammatically at 148. This may occur, for instance, if a bad splice is detected by unit 41, or if there is a break in the film 33. But it is not desirable to have this signal given when the clamping unit 37, in the normal operation of the storage elevator, has been actuated to clamp the film 33 and temporarily stop movement of the film past the guide roller 35. For this reason, a sensing unit similar to that illustrated in FIGS. 7 and 8 is mounted at the outer end of the upper set of rollers 47. The cam 131', similar to the cam 131, is fastened to the other end of the shaft 49 retained by a collar 149. In order to adjust the rotational position of the cam 131', and have the cam rotate with the rollers, the end roller 47 is secured for rotation with the shaft 49 by a setscrew. The switch contact arms are mounted on the rod 55 and have a structure and operation similar to that explained. The sensing unit mounted in conjunction with the guide roller 35 is electrically connected with the other sensing unit mounted in connection with the upper set of rollers 47 such that upon operation of the clamping unit 37, a switch is automatically made from the former unit to the latter unit so that the signal which is actuated upon a lapse of five seconds of making and breaking contacts is not actuated so long as the upper rollers 47 are feeding out film while the lower set of rollers and movable carriage are moving upward. Upon manually actuating the switch 123 to release the clamping unit, the sensing unit associated with the guide roller 35 is again activated, whereas the other is switched off.

To briefly review the operation of the film storage elevator, so long as the film 33 is feeding off of the supply reel 23, the film 33 moves over the guide roller 35, through the clamping unit 37, over the guide rollers 39 and 45, and up onto the first of the permanently mounted upper set of rollers 47. From there the film 33 moves alternately over a bottom roller, the next upper roller, the next lower roller, and so on, until feeding out of the machine at the end one of the upper rollers 47. A drive associated with the remainder of the film processing machine, not here shown, pulls the film 33 through the rollers to provide a substantially continuous feed. When there is a stoppage of the feeding of film into the upper set of rollers 47, the lower set of rollers 59 and the movable carriage 63 are caused to rise on the guide rail 73. This results in a continuation of the feeding of film from the storage elevator to the remainder of the film processing machine for a period of time limited by the engagement of the cam arm 97 with the switch 99, which is electrically connected to stop the entire processing machine including the film storage elevator. This stoppage of feeding into the upper set of rollers 47 may be occasioned by reaching the end of the supply reel 23, the weight of the reel 23 producing a drag in the system. Another reason for stoppage may be the detection of a bad splice by the bad splice detector 41.

As the movable carriage 63 rises from its lower rest position, the cam arm 97 moves off of the switch 101 to signal the operator and also to activate the clamping unit 37 to clamp the film 33 between the two clamping jaws 115 and 119. More specifically, the solenoid 105 is energized to swing the lever 109 in a counterclockwise direction and move the movable clamping jaw 119 into engagement with the film 33. Upon completing the splice of the end of the reel 23 then in use with the leading end of the film on the reserve reel in the other compartment of the reel box 19, the manual switch 123 is depressed to deenergize the solenoid 105, and move the clamping jaw 119 back to released position upon clockwise swinging of the lever 109 by the counterweight 113.

The drive for the movable carriage 63 and the lower set of rollers 59 including the sprocket chain 83, overrunning clutch 91, and motor 93 (FIG. 3) is arranged such that the movable carriage may move freely upwardly at any rate of speed. Upon the recontinuation of feeding of film into the first of the upper rollers 47, the lower carriage 63 and set of rollers 59 begins to descend back down to its lower rest position. The gear motor 93 having a fixed speed output determines the rate at which the sprocket chain 83 may run over the drive sprocket gear 87. If the carriage tends to descend at a rate faster than this the overrunning clutch locks to the motor drive and will not allow it. Of course, the carriage may freely rise at any time, since the clutch is always free in this direction. Upon resuming its lower rest position, the movable carriage cam arm 97 again engages the switch 101, which may also be connected with the motor 93 to turn it off.

As a further check on the operating conditions, the sensing cam 131 rotatable with the guide roller 35 alternately makes and breaks the contact of the switch contact 137 with the permanent contact on the arm 139, a lapse of five seconds or more serving to signal the operator. While the new reel is being spliced on, however, the sensing in this manner is transferred to an identical unit associated with the upper set of rollers 47, of which the cam 131' is rotatable with the roller shaft 49. Upon making the splice, the sensing is switched back to the unit associated with the guide roller 35.

The film storage elevator according to the invention is designed to more efficiently provide a continuous feeding of film from the supply reels of film into the remainder of the film processing apparatus. The descent of the movable carriage and lower row of rollers is controlled so that the machinery is not damaged and the film does not become loose or tangled, or both. Appropriate devices are provided for signalling the operator when the machine needs attention.

It is seen from the foregoing disclosure that the above mentioned objects of the invention are well fulfilled. It is to be understood that the foregoing disclosure is given by way of illustrative example only, rather than by way of limitation, and that without departing from the invention, the details may be caried within the scope of the appended claims.

What is claimed is:

1. A film storage elevator comprising an upper row of rollers and a lower row of rollers, means for fixedly mounting said upper row of rollers and for slidably mounting said lower row of rollers for bodily movement toward and away from said upper row of rollers, means for limiting the movement of said lower row of rollers in a direction away from said upper row of rollers at a rest position, at least one supply film reel mounted for rotation, the film on said reel being adapted to be looped over a first one of said upper rollers to a first one of said lower rollers and back up to the next of said upper rollers proceeding in order from one side to the other, the film feeding continuously from said supply reel alternately between said upper and lower rows of rollers, a temporary stoppage of feeding the film into said rows of rollers causing said lower row of rollers to move toward said upper row of rollers to continue the passage of film therefrom for a limited period of time, means for driving said lower row of rollers for return movement back to said rest position after the film stoppage has been corrected and film is again feeding into said upper row of rollers, said driving means including an overruning clutch and a fixed speed output motor coupled therewith for limiting the rate of return movement to prevent damage and loosening and tangling of the film, a clamping unit mounted between said reel and upper row of rollers and comprising a pair of jaws between which the film passes, means for mounting the jaws for movement between a released postion and a clamping position engaging the film, a switch to be actuated by the movement of said lower row of rollers away from said rest position, said switch being connected with said clamping unit to move said jaws to said clamping position upon being actuated, and means for releasing said jaws for return to said released position to allow free passage of the film therebetween.

2. A film storage elevator comprising an upper row of rollers and a lower row of rollers, means for fixedly mounting said upper row of rollers and for slidably mounting said lower row of rollers for bodily movement toward and away from said upper row of rollers, means for limiting the movement of said lower row of rollers in a direction away from said upper row of rollers at a rest position, at least one supply film reel mounted for rotation, the film on said reel being adapted to be looped over a first one of said upper rollers to a first one of said lower rollers and back up to the next of said upper rollers proceeding in order from one side to the other, the film feeding continuously from said supply reel alternately between said upper and lower rows of rollers, a temporary stoppage of feeding the film into said rows of rollers causing said lower row of rollers to move toward said upper row of rollers to continue the passage of film therefrom for a limited period of time, means for driving said lower row of rollers for return movement back to said rest position after the film stoppage has been corrected and film is again feeding into said upper row of rollers, said driving means including an overruning clutch and a fixed speed output motor coupled therewith for limiting the rate of return movement to prevent damage and loosening and tangling of the film, a pair of sensing devices for continuously making and breaking contacts, a lapse in the making and breaking of contacts serving to actuate a signal to the operator that the machine needs attention, one of said sensing devices being operated by passage of the film between said supply reel and upper row of rollers while the other of said sensing devices is operated by rotation of said upper row of rollers, said second sensing device actuating the signal only when said clamping unit is in its clamping position and said first sensing device being disconnected during this time.

3. A film storage elevator comprising an upper row of rollers and a lower row of roller, means for fixedly mounting said upper row of rollers and means for securing said lower row of rollers to a movable carriage, vertically disposed guide rail means for guiding said carriage for sliding toward and away from said upper row of rollers, means for limiting the movement of said carriage in either direction and providing a rest position in a direction away from said upper row of rollers, at least one supply reel of film mounted for rotation, the film on said reel being adapted to be looped over a first one of the upper rollers to the first one of the lower rollers and back up to the next of the upper rollers proceeding in order from side to side, the film feeding continuously from said supply reel alternately between said rows of rollers, a temporary stoppage of film due to reaching the end of the reel producing a drag which causes said lower row of rollers and movable carriage to move toward said upper row of rollers to continue the passage of film therefrom for a limited period of time sufficient to splice on a new reel of film, means for driving said movable carriage back down to its rest position after the new film is spliced on and film is again feeding into said rows of rollers, said driving means including an overrunning clutch and a fixed speed output motor coupled therewith for limiting the rate of return movement while being free in the other direction to allow movement of said movable carriage toward said upper row of rollers at any rate.

4. A construction as defined in claim 3, including a clamping unit mounted between said supply reel and said upper row of rollers, said clamping unit having a released position allowing free passage of the film and a clamping position in which the film is clamped, a switch to be actuated by movement of said carriage away from its rest position for moving said clamping unit to its clamping position, to temporarily stop feeding of the film while the new reel is being spliced on, and another switch for releasing said clamping unit for movement to its released position so that the film again feeds into said upper row of rollers.

5. A construction as defined in claim 4, further including a bad splice detector mounted in advance of said upper row of rollers, and sensing means operated by passage of the film and arranged to actuate a signal after a period of inoperativeness due to stoppage of the passage of film.

6. Photographic film handling apparatus comprising an upper series of film guide rollers, a lower series of film guide rollers, means for supplying film to pass from an entrance roller to an exit roller and between them to be threaded alternately over rollers of the upper and lower series, and carriage means mounting the rollers of the lower series for bodily movement toward and away from the rollers of the upper series to accommodate a variable supply of film between the entrance roller and the exit roller, said apparatus being characterized by a constant speed motor, and means including an overrunning one-way clutch operatively connecting said motor to said carriage means in such manner that said carriage means may rise independently of the speed of the motor by overrunning said clutch and the speed of downward movement of said carriage means is limited by the speed of said motor.

7. Photographic film handling apparatus comprising an upper series of film guide rollers, a lower series of film guide rollers, means for supplying film to pass from an entrance roller to an exit roller and between them to be threaded alternately over rollers of the upper and lower series, and carriage means mounting the rollers of the lower series for bodily movement toward and away from the rollers of the upper series to accommodate a variable supply of film between the entrance roller and the exit roller, said apparatus being characterized by a flexible element secured to said carriage means to be moved in one direction by upward movement of said carriage means as a result of withdrawal of film over said exit roller at a faster rate than film is introduced over said entrance roller and to be moved in the opposite direction by downward movement of said carriage means as a result of introduction of film over said entrance roller at a faster rate than film is withdrawn over said exit roller, a constant speed motor, a rotary member operatively engaged with said flexible element, and a one-way overrunning clutch operatively connecting said motor to said rotary member, said clutch being so arranged that the speed of movement of said rotary member and said flexible element in a direction for downward movement of said carriage means is limited by the speed of said constant speed motor, and the speed of movement of said rotary member and said flexible element in the opposite direction is independent of the speed of said motor.

8. A construction as defined in claim 7, in which said flexible element is a chain, and in which said rotary member is a sprocket over which said chain runs.

9. Photographic film handling apparatus comprising an upper series of film guide rollers, a lower series of film guide rollers, means for supplying film to pass from an entrance roller to an exit roller and between them to be threaded alternately over rollers of the upper and lower series, and carriage means mounting the rollers of the lower series for bodily movement toward and away from the rollers of the upper series to accommodate a variable supply of film between the entrance roller and the exit roller, said apparatus being characterized by one of said rollers being driven by film traveling through said apparatus, electric motion-sensing means operatively connected to said one of said rollers to be driven thereby, and an attention attracting signalling device controlled at least in part by said motion-sensing means for causing operation thereof when said film fails to operate said one of said rollers to signal failure of film feed during operation of said machine.

10. Photographic film handling apparatus comprising an upper series of film guide rollers, a lower series of film guide rollers, means for supplying film to pass from an entrance roller to an exit roller and between them to be threaded alternately over rollers of the upper and lower series, and carriage means mounting the rollers of the lower series for bodily movement toward and way from the rollers of the upper series to accommodate a variable supply of film between the entrance roller and the exit roller, said apparatus being characterized by the exit and entrance rollers being rotated during film feeding operation, electric motion-sensing means operatively connected to said entrance roller to be driven thereby only during film feeding operation thereof, other electric motion-sensing means operatively connected to said exit roller to be driven thereby only during film feeding operation thereof, and means for operatively connecting said signalling device alternatively to one or the other of said motion-sensing means for causing operation of said signalling device when film feeding has stopped at either of said entrance or exit rollers.

References Cited in the file of this patent

UNITED STATES PATENTS

| 2,010,122 | Wikle | Aug. 6, 1935 |
| 2,048,182 | De Ybarrondo | July 21, 1936 |
| 2,880,943 | Stephens | Apr. 7, 1959 |